United States Patent
Olkkonen

(10) Patent No.: US 12,019,236 B2
(45) Date of Patent: Jun. 25, 2024

(54) DIFFRACTIVE EXIT PUPIL EXPANDER ARRANGEMENT FOR DISPLAY APPLICATIONS

(71) Applicant: DISPELIX OY, Espoo (FI)

(72) Inventor: Juuso Olkkonen, Espoo (FI)

(73) Assignee: DISPELIX OY, Espoo (FI)

( * ) Notice: Subject to any disclaimer, the term of this patent is extended or adjusted under 35 U.S.C. 154(b) by 884 days.

(21) Appl. No.: 17/041,313

(22) PCT Filed: Apr. 10, 2019

(86) PCT No.: PCT/FI2019/050292
§ 371 (c)(1),
(2) Date: Sep. 24, 2020

(87) PCT Pub. No.: WO2019/202205
PCT Pub. Date: Oct. 24, 2019

(65) Prior Publication Data
US 2021/0364788 A1 Nov. 25, 2021

(30) Foreign Application Priority Data

Apr. 19, 2018 (FI) ..................................... 20185372

(51) Int. Cl.
*G02B 27/00* (2006.01)
*F21V 8/00* (2006.01)
(Continued)

(52) U.S. Cl.
CPC ....... *G02B 27/0081* (2013.01); *G02B 6/0013* (2013.01); *G02B 27/0172* (2013.01); *G02B 27/4233* (2013.01)

(58) Field of Classification Search
CPC .............. G02B 27/0081; G02B 6/0013; G02B 27/0172; G02B 27/4233; G02B 6/34;
(Continued)

(56) References Cited

U.S. PATENT DOCUMENTS 7,133,204 B2 11/2006 Urey
7,339,737 B2 3/2008 Urey et al.
(Continued)

FOREIGN PATENT DOCUMENTS

CA 2992213 A1 4/2018
CN 1685291 A 10/2005
(Continued)

OTHER PUBLICATIONS

FI Search Report in Application No. 20185372 dated Nov. 2, 2018.
(Continued)

*Primary Examiner* — Mustak Choudhury
*Assistant Examiner* — K Muhammad
(74) *Attorney, Agent, or Firm* — Maschoff Brennan

(57) ABSTRACT

The invention relates to a diffractive exit pupil expander arrangement for display applications. The arrangement comprises a first lightguide element (51) comprising an exit pupil expander (53) and arranged in a first plane and a second lightguide element (41) comprising an in-coupler (42) and arranged in a second plane. The in-coupler is optically coupled with the exit pupil expander (53). Further, the first lightguide element (51) is arranged to confine propagation of light laterally in said first plane by reflections, and the first plane and the second plane are arranged at an angle (a) with respect to each other.

17 Claims, 4 Drawing Sheets

(51) Int. Cl.
*G02B 27/01* (2006.01)
*G02B 27/42* (2006.01)

(58) Field of Classification Search
CPC .... G02B 2027/0125; G02B 2027/0174; G02B 5/1842; G02B 27/0018; G02B 5/1814; G02B 27/4205; G02B 6/0016; G02B 6/0036; G02B 27/0101; G02B 27/4272
See application file for complete search history.

(56) References Cited

U.S. PATENT DOCUMENTS

| | | | |
|---|---|---|---|
| 9,507,150 B1* | 11/2016 | Stratton | G02F 1/163 |
| 9,523,852 B1 | 12/2016 | Brown et al. | |
| 9,599,813 B1 | 3/2017 | Stratton et al. | |
| 10,088,675 B1 | 10/2018 | Brown et al. | |
| 2004/0062502 A1 | 4/2004 | Levola | |
| 2006/0132914 A1 | 6/2006 | Weiss et al. | |
| 2009/0040580 A1 | 2/2009 | Mukawa | |
| 2010/0246003 A1 | 9/2010 | Simmonds et al. | |
| 2010/0246004 A1 | 9/2010 | Simmonds | |
| 2010/0328794 A1 | 12/2010 | Levola et al. | |
| 2011/0026128 A1 | 2/2011 | Baker et al. | |
| 2013/0250431 A1 | 9/2013 | Robbins et al. | |
| 2014/0140654 A1 | 5/2014 | Brown et al. | |
| 2015/0243103 A1 | 8/2015 | Schowengerdt | |
| 2015/0268474 A1 | 9/2015 | Cheng et al. | |
| 2017/0003504 A1 | 1/2017 | Vallius et al. | |
| 2017/0038593 A1 | 2/2017 | Travers | |
| 2017/0131545 A1 | 5/2017 | Wall et al. | |
| 2017/0236463 A1* | 8/2017 | Chi | G02B 27/141 |
| | | | 345/694 |
| 2017/0248790 A1 | 8/2017 | Cheng | |
| 2018/0210198 A1 | 7/2018 | Brown et al. | |
| 2018/0210202 A1* | 7/2018 | Danziger | G02B 6/2786 |
| 2018/0210205 A1 | 7/2018 | Grey | |

FOREIGN PATENT DOCUMENTS

| | | |
|---|---|---|
| CN | 1892271 A | 1/2007 |
| CN | 102928981 A | 2/2013 |
| CN | 106489177 A | 3/2017 |
| CN | 106575034 A | 4/2017 |
| CN | 107632406 A | 1/2018 |
| CN | 107710051 A | 2/2018 |
| CN | 107797287 A | 3/2018 |
| EP | 3 574 362 A1 | 12/2019 |
| JP | 2014132328 A | 7/2014 |
| WO | 2018014467 A1 | 1/2018 |
| WO | WO-2018014467 A1 * | 1/2018 |
| WO | 2018/065975 A1 | 4/2018 |
| WO | 2018140198 A1 | 8/2018 |

OTHER PUBLICATIONS

CN Office Action in Application No. 201980010387.X dated Aug. 30, 2021.
Supplementary European Search Report dated Aug. 13, 2021 as received in U.S. Appl. No. 19/788,768.
IN Patent Examination Report dated Jul. 20, 2022 as received in Application No. 202047045192.

* cited by examiner

DIFFRACTIVE EXIT PUPIL EXPANDER ARRANGEMENT FOR DISPLAY APPLICATIONS

FIELD OF THE INVENTION

The invention relates to optical devices. In particular, the invention relates to diffractive exit pupil expanders used in display devices such as near-to-eye displays (NEDs), head-mounted displays (HMDs) and head-up displays (HUDs).

BACKGROUND OF THE INVENTION

NEDs, HMDs, and HUDs typically contain two fundamental parts: a projector and a combiner element. The projector produces a virtual image that is overlaid on top of the user's real-world view with the aid of the combiner element. In NEDs and HMDs, the combiner element is typically a semi-transparent and is located at a distance of 1-3 cm from the eye. The combiner element can be a semi-transparent mirror or a more complicated optical assembly, such as a diffractive, holographic or reflective lightguide, or a free-form prism.

Diffractive lightguides typically contain a diffractive exit pupil expander (EPE) that expands the in-coupled light beam in one or two directions. The beam expansion inside the lightguide in two-direction enables the use of a projector with a very small aperture stop. The small aperture stop reduces the f-number of the projection optics and makes it easier to design for high field of views (FOVs). The size of the aperture stop also correlates with the size of the projector: the smaller the aperture stop, the smaller the projector for a fixed FOV.

Several grating geometries for beam expansion inside the lightguide have been presented in the past. In all these solutions, a lightguide consist of two parallel planar surfaces that confine light propagation inside the light guide in one direction that is parallel to the surface normal of the lightguide surfaces. In other two directions, light can propagate and spread freely. This typically leads to a problem that with large FOVs, the physical size of the light guide becomes too large for wearable displays.

A disadvantage of 1D EPE lightguides is the large in-coupler that needs to be illuminated by the projector. This increases the projector size so much that 1D lightguides with large FOV (>40 deg) are not typically used. U.S. Pat. No. 7,576,916 B2 presents a solution where exit pupil expansion in one dimension is done with a separate lightguide in front of the in-coupler of the main lightguide. A drawback challenge in this approach is that the first lightguide gets too wide for practical applications, especially for the large FOV applications. This also decreases the efficiency of the in-coupling process in the main lightguide as the in-coupler width gets large and in-coupled rays will hit the in-coupler again and a part of the energy gets out-coupled.

SUMMARY OF THE INVENTION

It is an aim of the invention to overcome at least some of the abovementioned problems and in particular to provide a solution enabling compact diffractive lightguide displays with large exit pupil. An aim is also to provide a solution suitable for applications requiring large FOV (>40 deg).

The aims are achieved by the invention as herein claimed.

The invention is based on the idea of using a cascade of diffractive lightguide elements whose lightguide planes are arranged at an angle with respect to each other. This way, the exit pupil of the diffractive display can be expanded without image distortions even if a small first lightguide with a 1D EPE is used, as will be discussed below.

The invention thus provides a diffractive exit pupil expander arrangement for display applications, the arrangement comprising a first lightguide element (expansion lightguide) comprising an exit pupil expander and arranged in a first plane and a second lightguide element (main lightguide) comprising an in-coupler and arranged in a second plane. The in-coupler is optically coupled with the exit pupil expander. Further, the first lightguide element is arranged to confine propagation of light laterally in said first plane by reflections, and the first plane and the second plane are arranged at an angle with respect to each other.

The invention also provides a personal display device comprising a display element comprising a diffractive exit pupil expander arrangement of the above kind and a microprojector for projecting an image to the display element. The exit pupil of the image is expanded in a first dimension in the first lightguide and in a second dimension in the second lightguide.

The invention offers significant benefits. Confinement of light propagation in two directions inside the first lightguide enables the design of more compact, efficient and lighter wearable display solutions. Due to confinement, light is not spread freely inside the expansion lightguide in the lateral plane and it can be kept narrow in the direction normal to the light propagation direction.

The expansion lightguide can comprise a single-layer waveguide or a multilayer lightguide stack. Even in the latter case there will not be large weight increase as the lateral size is small due to 2D light confinement. Multilayer waveguide can also be used maximize the FOV.

The main lightguide is preferably a single-layer waveguide, which ensures low weight, low cost and good see-through properties, in addition to preventing formation of ghost images therein.

The dependent claims are directed so selected embodiments.

In some embodiments, the first lightguide element comprises lateral side walls arranged perpendicular to the first plane. Lateral light confinement is achieved by reflection at the lateral side walls. The side walls are preferably of polished quality to ensure accurate reflections. The side walls may be arranged to reflect light by total internal reflections (TIRs) or they may be provided with a reflective coating, such as metal coating.

The angle between the two lightguides can be e.g. 1-70, typically 20-60, such as 45 degrees.

In some embodiments, the diffractive exit pupil expander is adapted to expand the exit pupil in a first dimension and the out-coupler is adapted to expand the exit pupil in a second dimension perpendicular to the first dimension. Typically, the angle between the planes is defined about a rotation axis parallel to the first dimension.

Next, selected embodiments of the invention are described in more detail with reference to the attached drawings.

DETAILED DESCRIPTION OF EMBODIMENTS

In some embodiments, there is provided a cascade of diffractive lightguides in which exit pupil is expanded in a first dimension in a first lightguide before coupling to a second lightguide. The first lightguide is capable of two-dimensional light confinement, i.e. confinement not only in perpendicular to the lightguide plane, as usual, but also laterally. A side effect of confinement, i.e. a mirror image formed, is handled by arranging the lightguides, or at least their optical interface, at an angle with respect to each other. Because of this, out-coupling of the mirror image from the second lightguide can be prevented.

Figure 1:
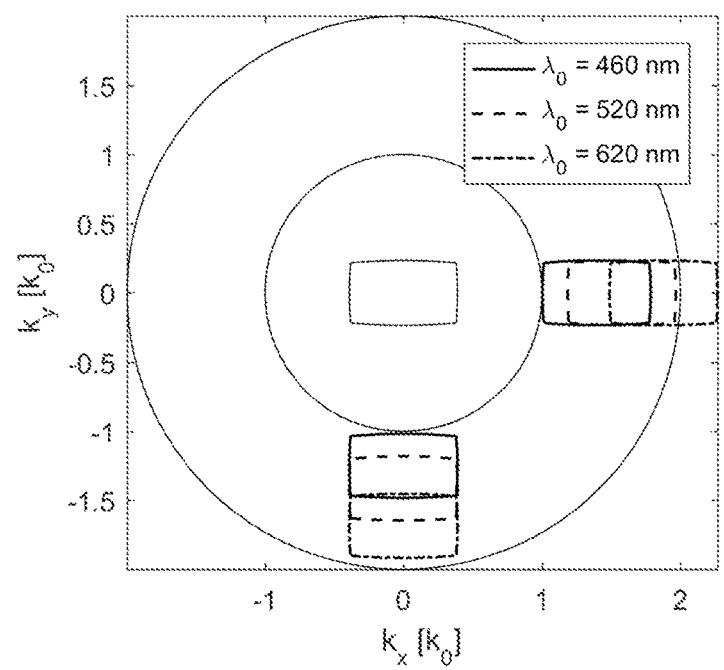
FIG. 1 shows wavevector diagram in the ($k_x$, $k_y$) plane for the 52 deg FOV image.

Two-dimensional exit pupil expansion in diffractive lightguides typically uses two main propagation directions inside the lightguide. As virtual images typically have 16:9 aspect ratio, lightguides with one dimensional exit pupil expansion can support higher FOV than lightguides with 2D EPEs. This is illustrated in FIG. 1 with a wavevector diagram. It is assumed that the lightguide resides in the xy-plane and thus light propagation can be analyzed via x- and y-components of the normalized wavevector. The lightguide in this example has a refractive index of 2.0. FOV points located in the annulus defined by the 1.0 radius and the 2.0 radius propagate in the lightguide via total internal reflection. The points outside the 2.0 radius circle are forbidden and never exist. The center FOV boxes represent the wavevectors of incident rays coming from the projector. Here it is assumed 52 deg FOV with 16:9 aspect ratio. It can be seen that entire FOV through visible wavelengths fit into 1.0/2.0 annulus when the FOV boxes are located at the 6 o'clock position while in the 3 o'clock position FOV of red light partially overlap the 2.0 circle boundary. Both of these locations are needed in traditional lightguides with 2D EPEs while lightguides with 1D EPE require only the 6 o'clock position.

Figure 2:
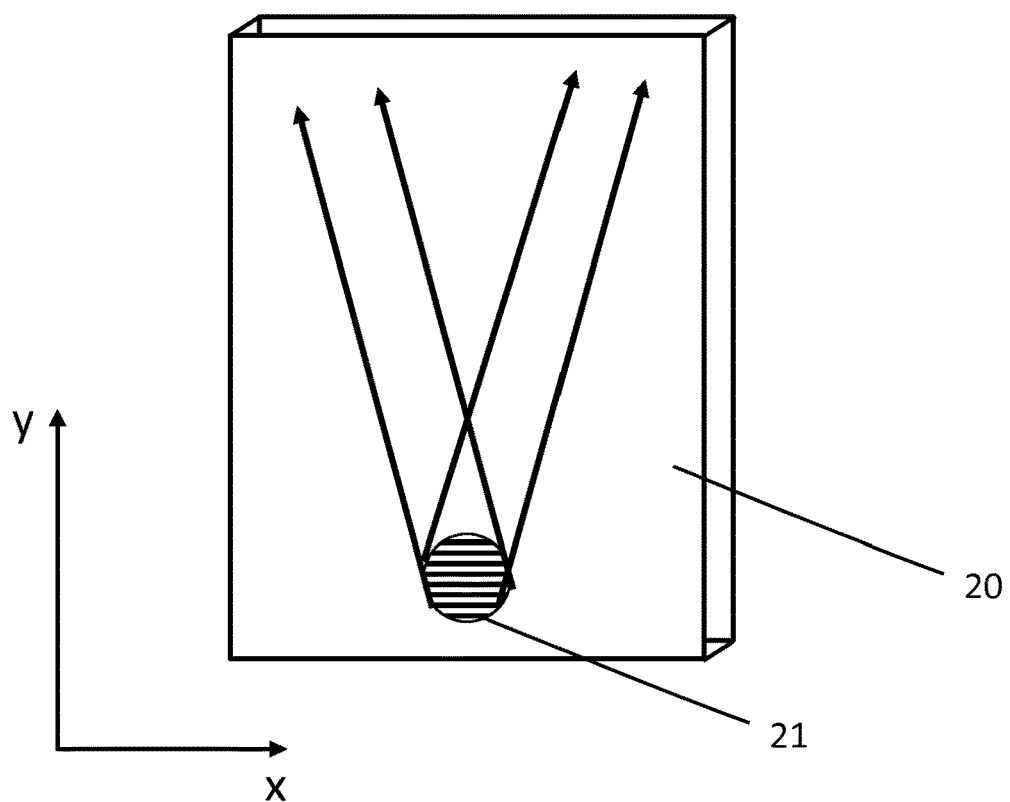
FIG. 2 illustrates light spreading in the lightguide without two-dimensional light confinement.

Light spreading in the lightguide 20 from the in-coupler 21 is illustrated in FIG. 2.

Figure 3:
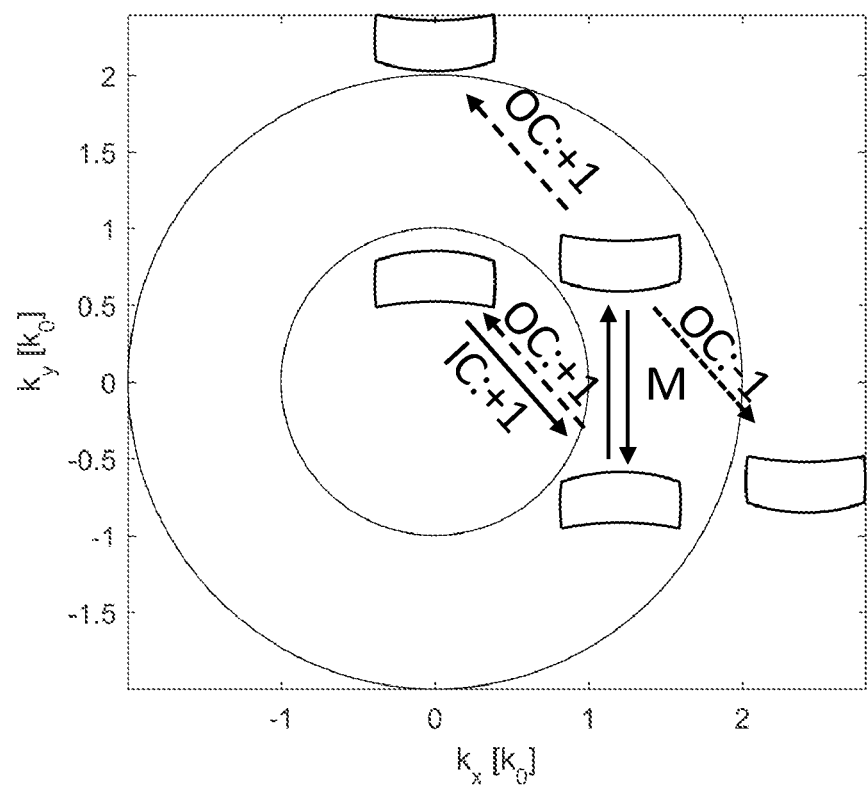
FIG. 3 shows wavevector diagram in the ($k_x$, $k_y$) plane for the beam expansion lightguide with two dimensional light confinement.

The light spreading can be solved by using two-dimensional light confinement. Light is not only reflected from the main surfaces of the light guide but also the side walls of the lightguide. This approach is not commonly used as the reflection from the side wall of the lightguide produces a mirror image that also gets out-coupled. This invention has solved the mirror image problem by using a configuration that does not out-couple the mirror image. This is achieved by tilting the lightguide so that the image coming from the projector appears in the wavevector diagram not in the center position but as a shifted due to the tilt. This is illustrated in FIG. 3. Here, a 45 deg tilt around the x-axis is assumed. The in-coupler (IC) in-couples the light to 1.0/2.0 annulus and the mirror reflection (M) from the side walls (surface normal parallel to y-axis) shifts the image up and down in the y-direction inside the annulus. The out-coupler (OC) moves the mirror out-side the 2.0 radius circle. These modes do not exist and thus the out-coupler only TIR reflects the mirror image but out-couples the normal image.

Figure 4:
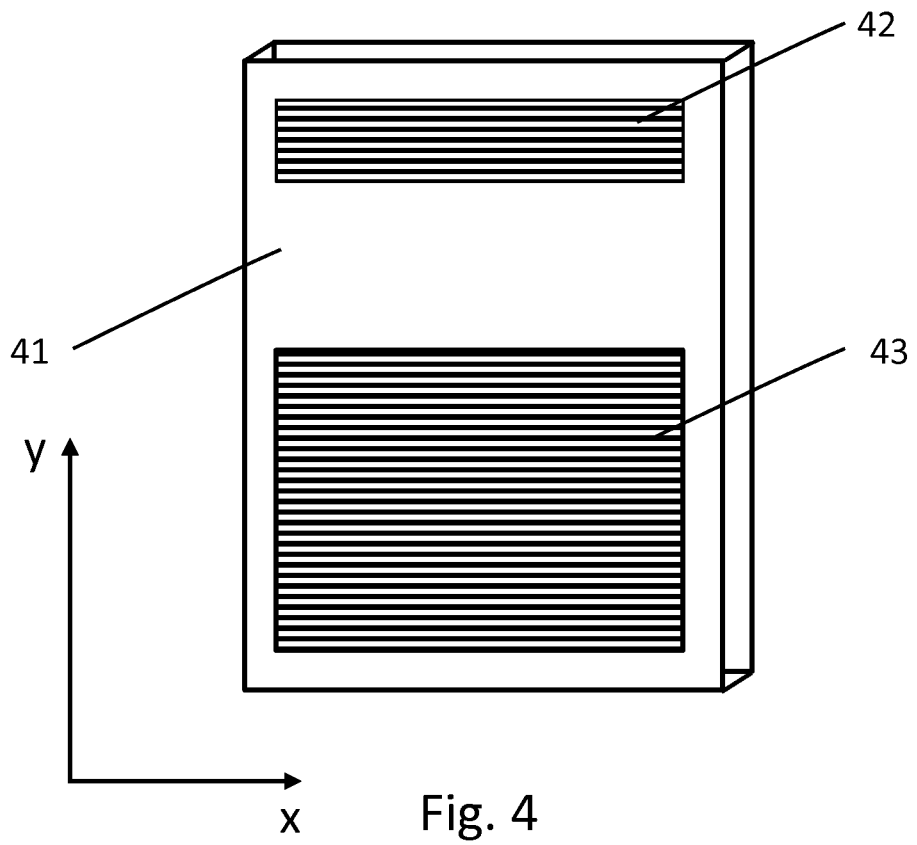
FIG. 4 shows the main lightguide with one-dimensional exit pupil expansion.

FIG. 4 illustrates a main lightguide 41 that can be used together with the presently disclosed expansion lightguide with 2D light confinement. The lightguide 41 has in-coupler 42 and the out-coupler 43. The in-coupler 42 is arranged on a first location of the lightguide 41 and its grating lines are oriented so as to diffract light towards the out-coupler 43, which is located laterally to the in-coupler 42. The out-coupler is adapted to expand the exit pupil in the propagation direction of light. The area of the in-coupler 42 typically corresponds at least the projection of the exit pupil expander of the expansion lightguide at the main lightguide plane so as to maximally capture light arriving therefrom.

Figure 5:
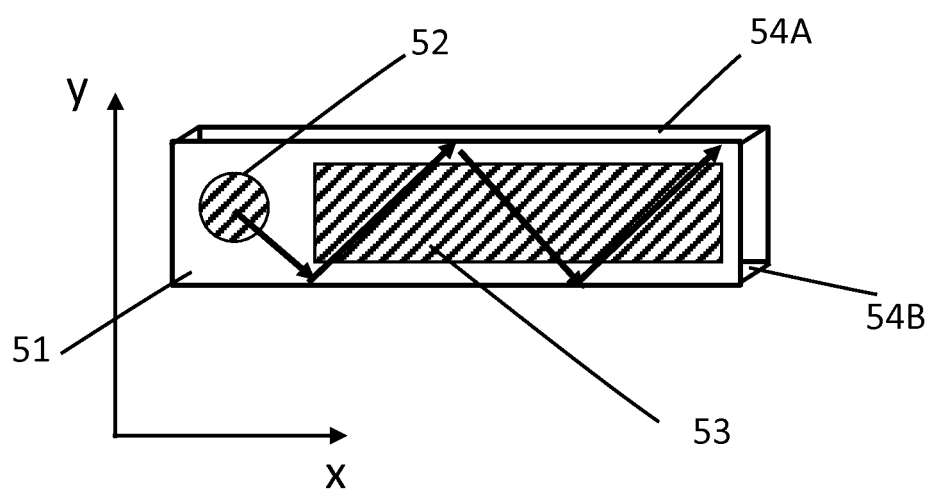
FIG. 5 shows the expansion lightguide with two-dimensional light confinement.

FIG. 5 shows the expansion lightguide 51. It has an in-coupler 52 and a 1D exit pupil expander 53 (serving also as an out-coupler of the expansion lightguide 51 for feeding the in-coupler 42 of the main lightguide 41). Light gets reflected from the side walls of the lightguide 54A, 54B during the light propagation. To avoid image distortions, the side walls have optical surface quality (preferably polished optical quality) and are also exactly perpendicular to the main surfaces of the lightguide. The grating line orientation of the in-coupler 52 and the exit pupil expander 53 can be oblique with respect to its main axes, by for example 45 degrees.

Figure 6:
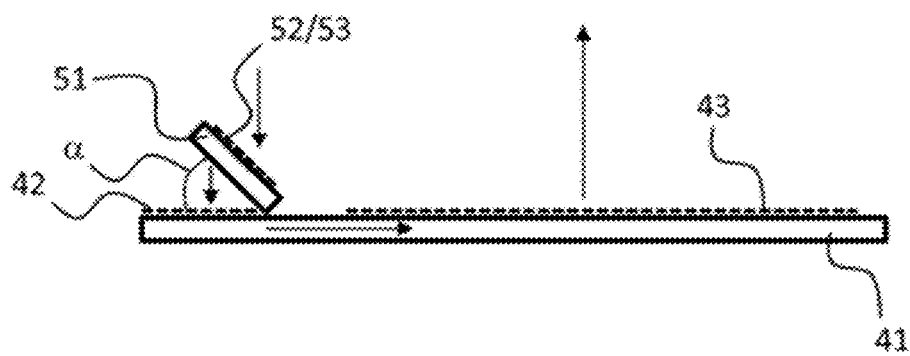
FIGS. 6 and 7 show side and perspective views of the main lightguide with the expansion lightguide.
Figure 7:
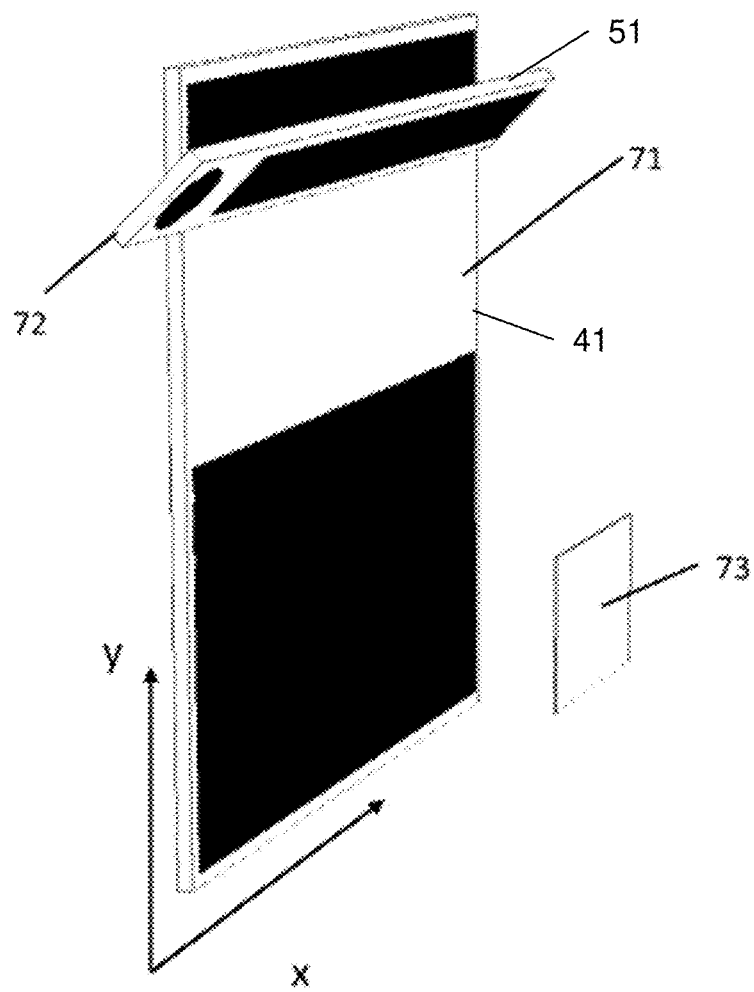

The total system with the main lightguide 41 having a plane 71 and the expansion lightguide 51 having a plane 72 is shown in FIGS. 6 and 7. There is an angle α between the planes of the lightguides 41, 51. The eyebox where the user's eye pupil should be located is denoted by reference numeral 73.

In FIG. 6, the initial light from a suitable microprojector is shown to arrive to the in-coupler 52 from above, i.e., the side of the expansion lightguide 51. In an alternative configuration, the initial light arrives from the opposite direction. In one embodiment, and as shown in FIG. 6, the projector is directed perpendicular to the plane of the second lightguide 41 and obliquely with respect to the plane of the first lightguide 51.

The in-couplers of the expansion lightguide and the main lightguide, the exit pupil expander and the out-coupler typically comprise diffractive gratings, which herein can be one-dimensional (linear) gratings, although other types of diffractive optical elements serving for the same purpose can be used too.

The expansion lightguide guide can comprise multiple layers to maximize the FOV.

In some embodiments, the lateral width of the first lightguide element is the same or less than the largest hop length of light rays in the second lightguide, i.e the distance between successive points of reflection of a propagating ray on a surface of the lightguide.

It can also have higher refractive index than the main lightguide as the size of the expansion lightguide is so small that even exotic glass materials (e.g. $TiO_2$) can be used without significant cost or weight increase.

The refractive index of the expansion lightguide is typically chosen between 1.7 and 2.3, whereas the refractive index of the main lightguide is the same or smaller.

The basic idea of the invention may be implemented in various ways in practice. The invention and its embodiments are thus in no way limited to the examples described above but they may vary with the scope of the claims.

CITATIONS LIST

Patent Literature

U.S. Pat. No. 7,576,916 B2

The invention claimed is:

1. A diffractive exit pupil expander arrangement for display applications, the arrangement comprising:
 a first lightguide element comprising an exit pupil expander and arranged in a first plane, and
 a second lightguide element comprising an in-coupler and arranged in a second plane, the in-coupler being optically coupled with the exit pupil expander,
 wherein:
  the first lightguide element is arranged to confine propagation of light laterally in said first plane by reflections,
  the exit pupil expander of the first lightguide element is an exit pupil expander grating adapted to expand the exit pupil in a first dimension,
  the first plane and the second plane are arranged with respect to each other at an angle between 20 degrees and 60 degrees, the angle being defined about an axis parallel to the first dimension,
  the in-coupler of the second lightguide element is an in-coupler grating,
  the first lightguide element comprises lateral side walls arranged perpendicular to the first plane and is arranged to confine propagation of light by reflection at the lateral side walls by lateral confinement,
  the second lightguide element further comprises an out-coupler optically coupled with the in-coupler of the second lightguide element,
  said lateral confinement produces a mirror image of an initial image propagating in the first lightguide element, and
  said angle is chosen so that the out-coupler reflects the mirror image but out-couples the normal image.

2. The arrangement according to claim 1, wherein said side walls are of optical quality.

3. The arrangement according to claim 1, wherein said side walls are arranged to reflect light by total internal reflections or provided with a reflective coating.

4. The arrangement according to claim 1, wherein the exit pupil expander is adapted to expand the exit pupil in a second dimension perpendicular to the first dimension.

5. The arrangement according to claim 1, wherein the first lightguide element further comprises a first light guide in-coupler arranged on the first light guide, which first light guide in-coupler is optically coupled with the exit pupil expander.

6. The arrangement according to claim 5, wherein the in-coupler of the first lightguide is located outside the footprint of the second lightguide element, when inspected perpendicular to the second plane.

7. The arrangement according to claim 6, wherein the in-coupler and exit pupil expander comprise gratings whose grating lines are oblique with respect to main axes of the lightguide.

8. The arrangement according to claim 1, wherein the first lightguide element comprises multiple lightguide layers.

9. The arrangement according to claim 1, wherein the lateral width of the first lightguide element is the same or less than the largest hop length of light rays in the second lightguide.

10. The arrangement according to claim 1, wherein the first lightguide element comprises lightguide material having a higher refractive index than the second lightguide element.

11. A personal display device comprising:
 a display element comprising a diffractive exit pupil expander arrangement according to claim 1, and
 a microprojector for projecting an image to the display element.

12. A cascade of diffractive lightguide elements having the diffractive exit pupil expander arrangement of claim 1, wherein whose lightguide planes are arranged at an angle with respect to each other for expanding the exit pupil of a diffractive display.

13. The arrangement according to claim 2, wherein said side walls are arranged to reflect light by total internal reflections or provided with a reflective coating.

14. The arrangement according to claim 1, wherein the first lightguide element further comprises an in-coupler optically coupled with the exit pupil expander.

15. The arrangement according to claim 14, wherein the in-coupler of the first lightguide is located outside the footprint of the second lightguide element, when inspected perpendicular to the second plane.

16. The arrangement according to claim 14, wherein the in-coupler and exit pupil expander comprise gratings whose grating lines are oblique with respect to main axes of the lightguide.

17. The arrangement according to claim 5, wherein the in-coupler and exit pupil expander comprise gratings whose grating lines are oblique with respect to main axes of the lightguide.

* * * * *